US 6,617,806 B2

(12) United States Patent
Kirkpatrick et al.

(10) Patent No.: US 6,617,806 B2
(45) Date of Patent: Sep. 9, 2003

(54) HIGH BRIGHTNESS MICROWAVE LAMP

(75) Inventors: Douglas A. Kirkpatrick, Great Falls, VA (US); James T. Dolan, Frederick, MD (US); Donald A. MacLennan, Gaithersburg, MD (US); Brian P. Turner, Damascus, MD (US); James E. Simpson, Gaithersburg, MD (US)

(73) Assignee: Fusion Lighting, Inc., Rockville, MD (US)

( * ) Notice: Subject to any disclaimer, the term of this patent is extended or adjusted under 35 U.S.C. 154(b) by 0 days.

(21) Appl. No.: 09/776,914

(22) Filed: Feb. 6, 2001

(65) Prior Publication Data

US 2002/0030453 A1 Mar. 14, 2002

Related U.S. Application Data

(63) Continuation of application No. PCT/US00/06688, filed on Apr. 28, 2000.
(60) Provisional application No. 60/133,885, filed on May 12, 1999, and provisional application No. 60/177,271, filed on Jan. 21, 2000.

(51) Int. Cl.⁷ .............................................. H05B 41/16
(52) U.S. Cl. ........................ 315/248; 315/39; 313/113
(58) Field of Search ..................... 315/248, 39, 111.21; 313/113

(56) References Cited

U.S. PATENT DOCUMENTS

| 4,013,919 A | 3/1977 | Corbley ........................ 315/73 |
| 4,361,782 A | 11/1982 | Reiling ......................... 315/73 |
| 4,376,259 A | 3/1983 | Rothwell, Jr. et al. ......... 315/74 |
| 4,752,718 A | 6/1988 | Strauss et al. ................. 315/73 |
| 4,928,040 A | 5/1990 | Uesaki et al. ................. 315/39 |
| 4,990,789 A * | 2/1991 | Uesaki ..................... 250/493.1 |
| 5,334,913 A | 8/1994 | Ury et al. .................... 315/248 |
| 5,404,076 A | 4/1995 | Dolan et al. ................. 313/572 |
| 5,841,233 A | 11/1998 | Ury et al. ..................... 315/39 |
| 5,903,091 A | 5/1999 | MacLennan et al. ........ 313/161 |

FOREIGN PATENT DOCUMENTS

| EP | 0889285 | 1/1999 |
| JP | 02-189805 | 7/1990 |
| WO | 98/53475 | 11/1998 |
| WO | 98/56213 | 12/1998 |
| WO | 99/36940 | 7/1999 |
| WO | 00/43815 | 7/2000 |

* cited by examiner

Primary Examiner—David Vu
(74) Attorney, Agent, or Firm—Paul E. Steiner

(57) ABSTRACT

An electrodeless microwave discharge lamp includes a source of microwave energy, a microwave cavity, a structure configured to transmit the microwave energy from the source to the microwave cavity, a bulb disposed within the microwave cavity, the bulb including a discharge forming fill which emits light when excited by the microwave energy, and a reflector disposed within the microwave cavity, wherein the reflector defines a reflective cavity which encompasses the bulb within its volume and has an inside surface area which is sufficiently less than an inside surface area of the microwave cavity. A portion of the reflector may define a light emitting aperture which extends from a position closely spaced to the bulb to a light transmissive end of the microwave cavity. Preferably, at least a portion of the reflector is spaced from a wall of the microwave cavity. The lamp may be substantially sealed from environmental contamination. The cavity may include a dielectric material is a sufficient amount to require a reduction in the size of the cavity to support the desired resonant mode.

17 Claims, 10 Drawing Sheets

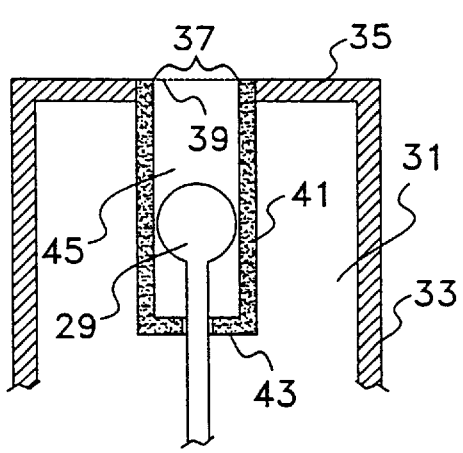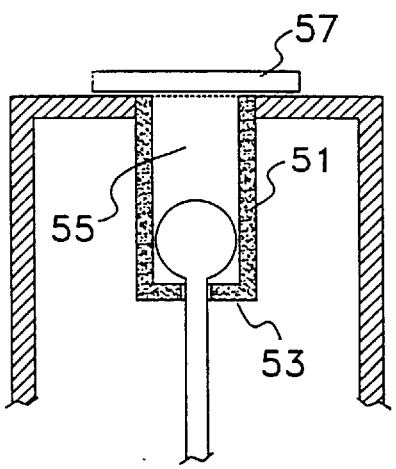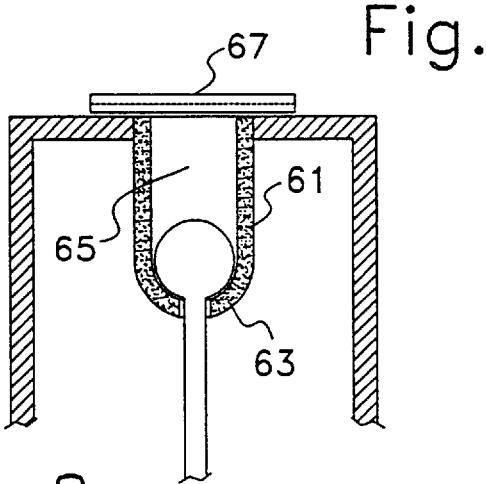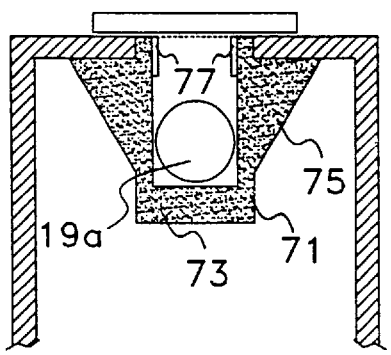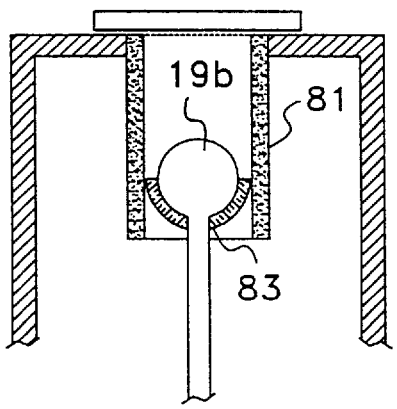
Fig. 6
Fig. 7
Fig. 8
Fig. 9
Fig. 10

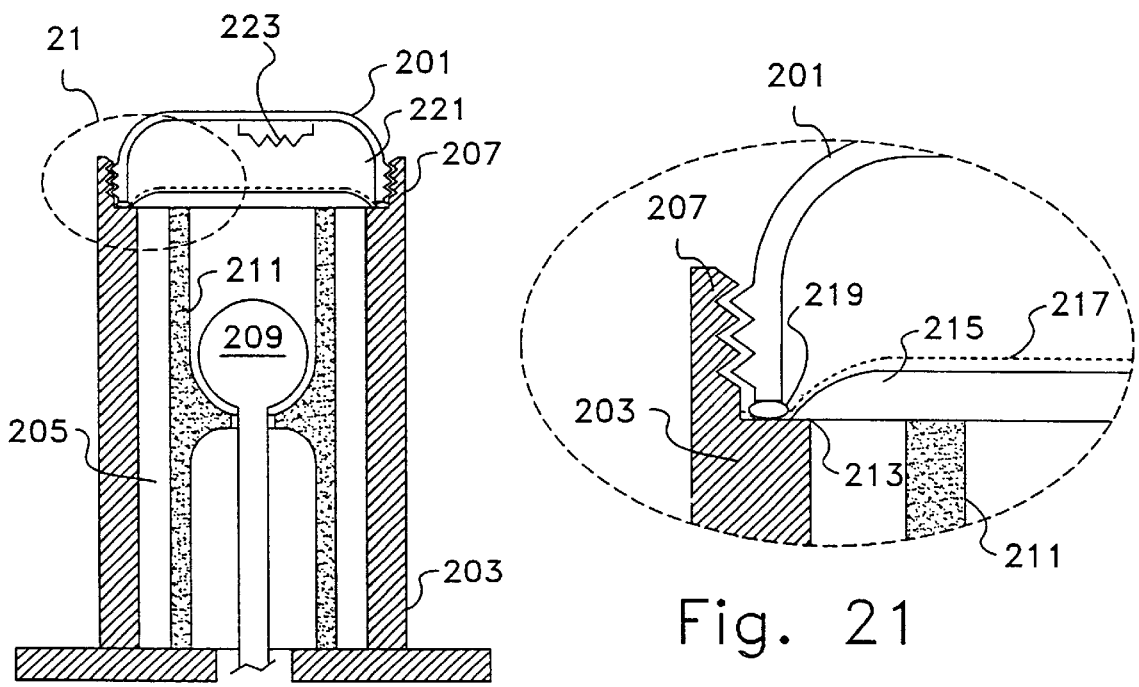
Fig. 20
Fig. 21
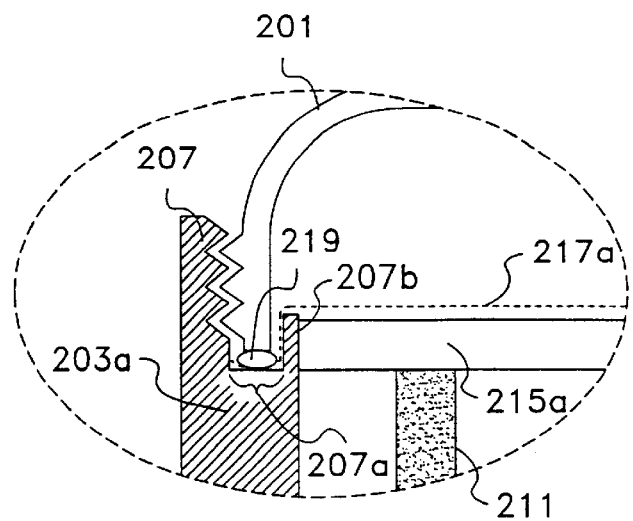
Fig. 22

US 6,617,806 B2

HIGH BRIGHTNESS MICROWAVE LAMP

This application is a continuation of international application number PCT/US00/06688, filed on Apr. 28, 2000, and claims the benefit of U.S. Provisional Application No. 60/133,885, filed May 12, 1999, and U.S. Provisional Application No. 60/177,271, filed Jan. 21, 2000.

The invention described herein was made with Government support under Contract No. DE-FC01-97EE23776 awarded by the Department of Energy. The Government has certain rights in this invention.

BACKGROUND

1. Field of the Invention

The present invention pertains to microwave discharge lamps. More particularly, the present invention relates to such lamps with light reflective material inside the microwave cavity. The present invention also relates to sealed microwave lamp systems.

2. Related Art

Microwave discharge lamps are well known in the art. In operation, a magnetron or other source of microwave energy transmits microwave energy through a waveguide to a microwave cavity. An electrodeless bulb containing a fill is disposed in the microwave cavity. The microwave energy is coupled to the fill, which emits light when excited.

U.S. Pat. No. 5,334,913 issued to Ury et al. and entitled "Microwave Powered Lamp having a Non-conductive Reflector within the Microwave Cavity" discloses a microwave discharge lamp which includes a reflector inside the microwave cavity. The internal reflector is typically used as a continuation of an external reflector to direct the light output.

FIG. 1 is a schematic view of a standard Light Drive® 1000 microwave discharge lamp commercially available from Fusion Lighting, Inc., Rockville, Md. USA. An enclosure 1 houses the magnetron and waveguide together with a power supply and control circuitry. Microwave energy is coupled to a microwave cavity 3 which is defined by a screen 4 having a solid portion 5 and a mesh portion 7. A bulb 9 is disposed in the microwave cavity 3. An external reflector 11 is mounted to the enclosure 1 around the microwave cavity 3. The bulb fill is typically a sulfur or selenium fill, for example, as described in U.S. Pat. No. 5,404,076.

As described in detail in U.S. Pat. No. 5,841,233, a dichroic mirror is mounted inside the microwave cavity 3. As shown in FIG. 2, the dichroic mirror 13 is mounted at a juncture between the solid portion 5 and the mesh portion 7 of the screen 4. The mirror 13 is used together with the external reflector 11 to direct the light output from the bulb 9. The bulb 9 is typically positioned at a focal point of the external reflector 11.

FIG. 3 is schematic, cross-sectional view of a microwave lamp with a reflective coating disposed on an interior surface of the microwave cavity, as disclosed in U.S. Pat. No. 5,903,091. A reflective coating 15 is disposed on the interior surface of a metal enclosure 17 which is configured as a resonant microwave cavity. A bulb 19 with no coating is also disposed within the enclosure 17. The enclosure defines an aperture 21 which is covered by a screen or mesh 23. Microwave energy is provided to the microwave cavity through a coupling slot. The energy is coupled to a fill in the bulb 19 which emits light when excited. The light exits the enclosure 17 primarily through the aperture 21.

SUMMARY

It is an object of the invention to provide a microwave discharge lamp which utilizes light reflective material inside the microwave cavity. Specifically, it is an object of the invention to provide a high power aperture lamp which can be effectively coupled to external optical elements. It is another object of the invention to provide a sealed microwave discharge lamp system.

According to one aspect of the invention, an electrodeless microwave discharge lamp includes a source of microwave energy, a microwave cavity, a coupling structure configured to transmit the microwave energy from the source to the microwave cavity, a bulb disposed within the microwave cavity, the bulb including a discharge forming fill which emits light when excited by the microwave energy, and a reflector disposed within the microwave cavity and spaced from the bulb, wherein the reflector defines a reflective cavity which encompasses the bulb within its volume and a light emitting aperture, and wherein the reflective cavity has an inside surface area which is significantly less than an inside surface area of the microwave cavity. In most examples, at least a portion of the reflector is spaced from a wall of the microwave cavity.

In some examples, a portion of the reflector defining the light emitting aperture extends from a position closely spaced to an exterior surface of the bulb to a light transmissive end portion of the microwave cavity. For example, an inner diameter of the reflector is slightly larger than an outer diameter of the bulb. The reflector may comprise a hollow cylinder of reflective material which is open on both ends and the bulb is adapted to reflect light into the hollow cylinder. Alternatively, the reflector comprises a hollow cylinder of reflective material which is open on one end and substantially closed on the other end, wherein the open end defines the light emitting aperture. If the bulb is attached to a stem, the substantially closed end comprises an opening adapted to receive the stem. The closed end may be spaced away from the bulb or may be closely spaced to the bulb. In some examples, the bulb is spherically shaped and the closed end is hemispherically shaped and closely spaced to the bulb. The closed end may be relatively thicker than the walls of the cylinder to promote heat transfer from the bulb.

Preferably, the reflector is made from a non-conductive and highly reflective material. For example, the material comprises silica or alumina or a combination thereof.

In some examples, the microwave cavity is defined by a hollow metal cylinder with solid walls which is open on one end and closed on the other end except for an aperture, and wherein an outer diameter of the reflector is adapted to closely match a diameter of the microwave cavity aperture. In other examples, the microwave cavity is defined by a hollow metal cylinder with solid walls which is open on both ends, and wherein the reflector comprises a hollow cylinder of reflective material which is open on one end and substantially closed on the other end, wherein the open end of the reflective cylinder defines the light emitting aperture and wherein an outer diameter of the reflective cylinder is closely matched to an inner diameter of the metal cylinder. Advantageously, the metal cylinder defining the microwave cavity is structurally rigid and resistant to deformation. The closed end of the reflector may comprise a separate reflective disk. In most examples, the closed end of the reflective cylinder is spaced from a wall of the microwave cavity and may be closely spaced to the bulb.

Preferably, the microwave cavity is substantially sealed from environmental contamination. For example, if the microwave cavity is defined by a hollow metal cylinder with solid walls which includes an opening on one end in the area of the light emitting aperture, the opening may be covered by a quartz plate. In some examples, the quartz plate comprises a conductive mesh disposed thereon or embedded therein.

According to another aspect of the invention, an electrodeless lamp includes a resonant cavity, a bulb disposed in the resonant cavity, the bulb containing a discharge forming fill, a source of energy coupled to the fill, and a dielectric material in the resonant cavity having a dielectric constant greater than the dielectric constant of air, the dielectric material filling a sufficient amount of the cavity to require a reduction in size of the cavity to support a desired resonant mode. Preferably, the dielectric material exhibits at least one of a high reflectivity and a high thermal conductivity. Also preferably, the dielectric material exhibits a dielectric constant of at least 2. More preferably, the dielectric material exhibits a dielectric constant of at least 4. For example, the dielectric material may comprise boron nitride.

Preferably, the dielectric material occupies a substantial portion of the microwave cavity. For example, where lamp comprises a coupling slot for directing energy into the resonant cavity, the dielectric material occupies substantially the entire portion of the resonant cavity between the coupling slot and the bulb. If the bulb is spherical, the dielectric material may define a semi-spherical recess around the bulb. The dielectric material may support the bulb or, if the bulb is attached to a stem, the dielectric material may define an opening adapted to receive the stem.

The foregoing objects, features, and advantages of the invention are achieved individually and in combination. The invention should not be construed as requiring two or more of the features described herein unless expressly recited in the claims.

BRIEF DESCRIPTION OF THE DRAWINGS

The foregoing and other objects, features, and advantages of the invention will be apparent from the following more particular description of the preferred examples as illustrated in the accompanying drawings in which like reference numerals generally refer to like elements throughout. The drawings are not necessarily to scale, emphasis instead being placed upon illustrating the principles of the invention.

FIG. 6 is a fragmented, cross-sectional view of a third microwave discharge lamp according to the invention.

FIG. 7 is a fragmented, cross-sectional view of a first alternative reflector configuration for the third example.

FIG. 8 is a fragmented, cross-sectional view of a second alternative reflector configuration for the third example.

FIG. 9 is a fragmented, cross-sectional view of a third alternative reflector configuration for the third example.

FIG. 10 is a fragmented, cross-sectional view of a fourth alternative reflector configuration for the third example.

FIG. 20 is a schematic, cross-sectional view of a fifth example of a microwave discharge lamp according to the invention.

FIG. 21 is an enlarged view of the area 21 in FIG. 20.

FIG. 22 is an enlarged view of a first alternative configuration for the fifth example.

DESCRIPTION

Figure 1:
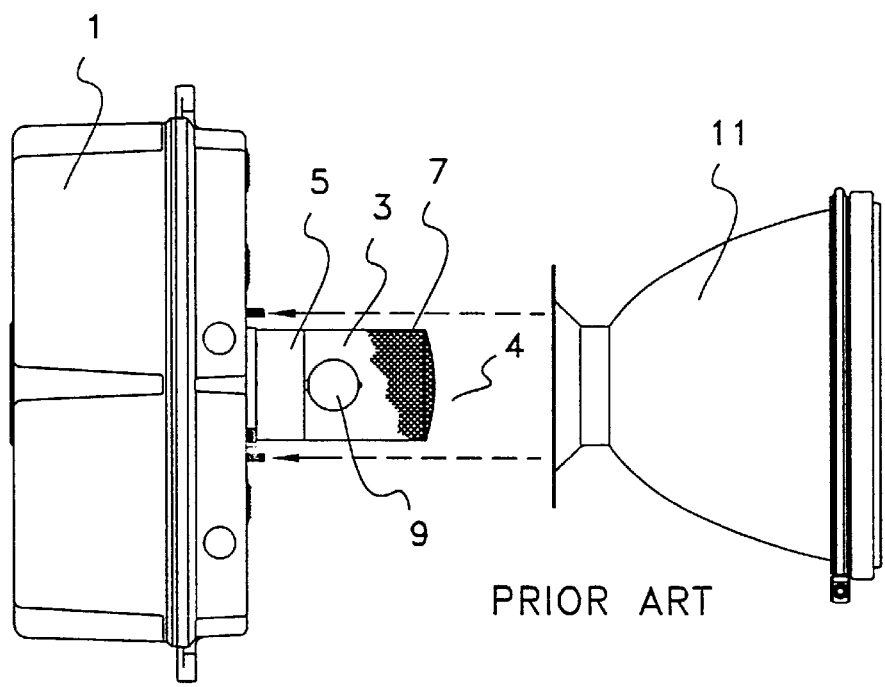
FIG. 1 is a schematic view of a conventional microwave discharge lamp with an external reflector.

In the following description, for purposes of explanation and not limitation, specific details are set forth such as particular structures, interfaces, techniques, etc. in order to provide a thorough understanding of the present invention. However, it will be apparent to those skilled in the art having the benefit of the present specification that the present invention may be practiced in other examples that depart from these specific details. In other instances, detailed descriptions of well known structures, devices, and methods are omitted so as not to obscure the description of the invention with unnecessary detail.

The light provided from conventional microwave discharge lamps is isotropic. In other words, the excited plasma emits lights in all directions. In many applications for light sources, however, it is desirable for the light to be more directional. For example, one application for the above mentioned Light Drive® 1000 is to provide light into a hollow light conduit or "light pipe" which distributes the light from the light source relatively uniformly over a certain distance (e.g. up to about 20 meters). For example, one type of light pipe utilizes an optical lighting film (OLF) and can only distribute light which enters the pipe within a certain beam angle (e.g. typically 26.5° half angle or less). Another type of light pipe is described in European Patent Publication No. EP 0 889 285. This light pipe requires a relatively narrow beam angle of light with a half angle of between 4° and 8°. A most preferred light pipe is described in U.S.

patent application No. 60/117,245 and corresponding PCT Application No. PCT/US00/00494. This most preferred light pipe combines inexpensive materials and simple construction to provide an efficient and uniform light distribution system which can beneficially utilize a light beam having an approximately 15° half angle or less.

In the Light Drive® 1000, the screen 4, dichroic mirror 13, and external reflector 11 described above are designed to direct as much of the light as possible into the desired 26.5° half angle for OLF light pipes. With an isotropic source, however, it is difficult to efficiently collect and redirect the light. The "unfolding" of the light from a spherical shape to a disk shape generally increases the etendue and lowers the brightness of the light source, thereby decreasing the amount of useful light which can be directed in a desired beam angle. This problem is further exacerbated by the losses at the dichroic mirror and external reflector surfaces. The bare bulb output for such a lamp is typically about 135,000 lumens while the measured light output from the external reflector within the required beam angle is only about 85,000 lumens, corresponding to a collection efficiency of about 63%. Actual light output into the space to be illuminated is even lower because of losses in the light pipe itself.

Another problem with conventional microwave discharge lamps is that the microwave screen and external reflector are prone to premature degradation. The reflector is subject to high temperatures and may be subject to environmental contaminants (e.g. particularly diesel fumes) which can oxidize at the reflector surface, thereby degrading light delivery. The front of the reflector may be sealed (e.g. with an ITO coated cover glass), but this increases the cost and decreases the light output. Also the cover increases the reflector temperature to a point which may degrade the reflective coating on the reflector.

A relatively fragile mesh forms a substantial part of the structure which defines the microwave cavity. Such a mesh is easily deformed which may cause problems with lamp operation and/or efficiency. Also, a significant fraction of the light output from the bulb is intercepted by the mesh. While much of this light may exit the cavity, the intercepted light is scattered by the mesh and only a fraction of that light enters the light pipe within the required beam angle.

Figure 3:
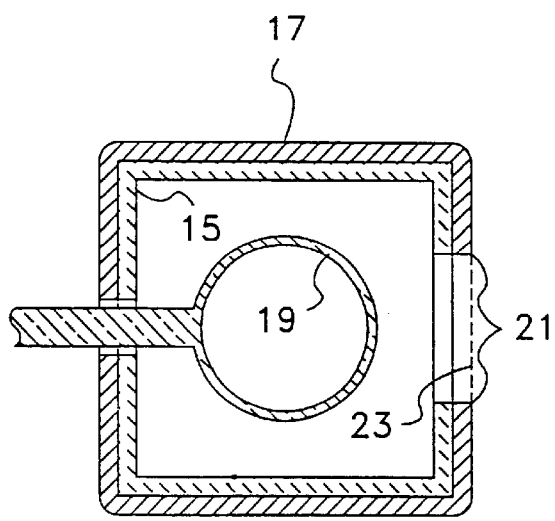
FIG. 3 is schematic, cross-sectional view of a microwave lamp with a reflective coating disposed on an interior surface of the microwave cavity.

The lamp shown in FIG. 3 potentially provides relatively more directional output than the standard Light Drive® 1000 configuration. The illustrated lamp utilizes a reflective coating which is substantially co-extensive with the microwave cavity except in the region of the aperture 21. In other words, the inside surface area of the reflective cavity is substantially equal to the inside surface area of the microwave cavity, exclusive of the aperture area. As used herein, the "reflective cavity" is defined as the interior volume defined by the interior surfaces of the reflective material.

Inside the reflective cavity, a photon may be reflected numerous times before exiting the lamp. Each reflection within the reflection cavity involves losses which reduce the amount of light exiting the reflection cavity. It is possible to decrease the reflection losses by disposing a ceramic jacket directly on the bulb, as described in the above referenced '091 patent. However, the closely spaced jacket is difficult to manufacture and limits the choice of materials to those having similar coefficients of thermal expansion with the quartz bulb.

Dielectric Loaded Cavity

It is desirable to be able to control the size of the lamp, in particular, the size of the resonant cavity, which may be the largest component of the lamp. However, this size is generally determined by the driving frequency (e.g. microwave or RF), since the cavity must be of a certain minimum size to support the appropriate field modes for a given driving frequency. Since the driving frequency is typically constrained by governmental regulation or the availability of specific parts, in the prior art, it was necessary for the resonant cavity of an electrodeless lamp to be at least of a certain size.

Still another consideration in electrodeless lamp design is the need to control the large amount of heat which is produced by the bulb. In some circumstances forced air cooling has been used in the prior art.

In accordance with one aspect of the present invention, a dielectric material having a dielectric constant of greater than air is used to fill a substantial portion of the resonant cavity. This enables a substantial reduction in the size of the cavity, while providing stable light output.

In accordance with another aspect of the invention, the dielectric material is a solid having a relatively high reflectivity, and therefore provides a reflecting surface which allows the light to be efficiently extracted from the cavity.

In accordance with yet another aspect of the invention, the dielectric material is a relatively good heat sink material, which provides improved temperature control of the lamp.

Figure 2:
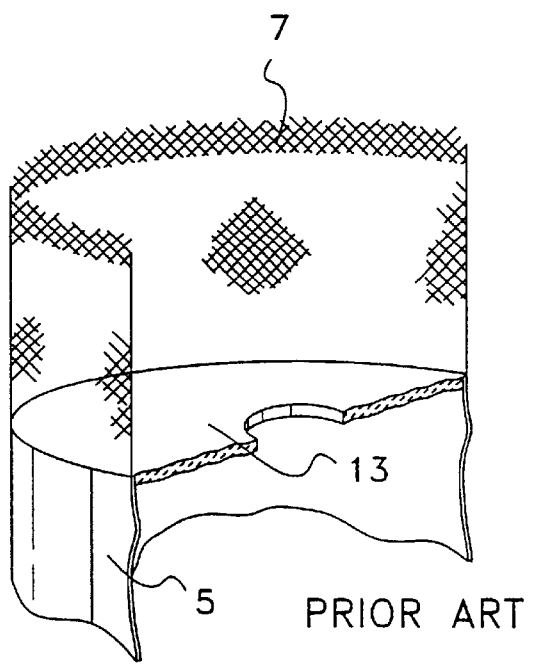
FIG. 2 is a fragmented, perspective view of a microwave cavity with a mirror mounted therein.

FIGS. 1 and 2 depict an example of a prior art electrodeless lamp wherein the microwave cavity 3 is filled with air. The bulb 9 and mirror 13 are both made from dielectric material and are located within the cavity 3, but do not significantly alter the resonant mode of the cavity 3.

FIRST EXAMPLE

Figure 4:
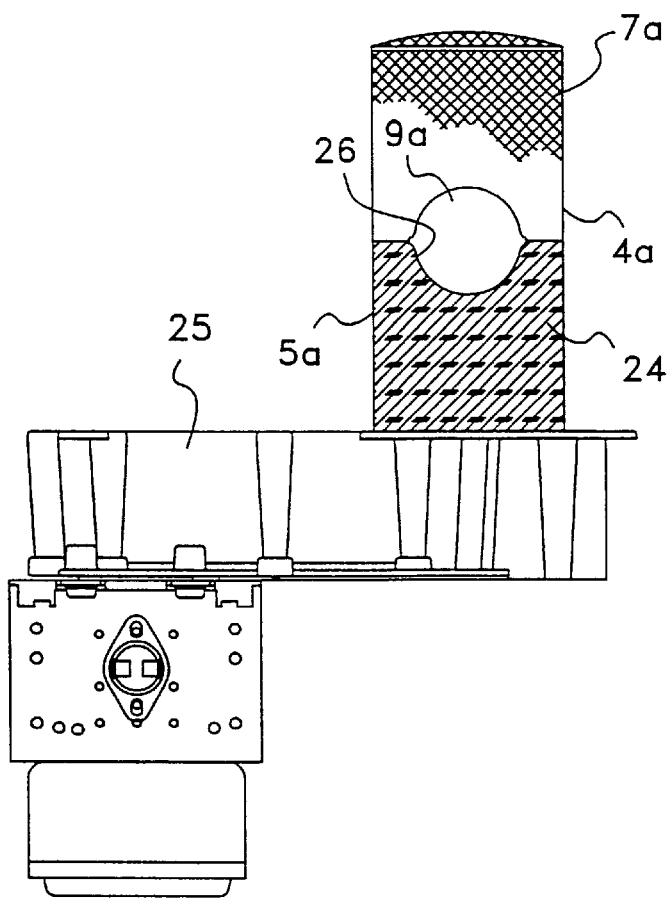
FIG. 4 is a schematic, partial cross sectional view of a first microwave discharge lamp with a dielectric loaded microwave cavity according to an aspect of the invention.

A first example of the present invention is depicted in FIG. 4, wherein like parts have similar reference numerals to those used in FIG. 1. Referring to FIG. 4, it is seen that the screen 4a includes a solid portion 5a and a mesh portion 7a. Additionally, a dielectric material 24 is present between a top surface of the waveguide 25 and the bulb 9a. The dielectric material 24 has a dielectric constant which is greater than the dielectric constant of air and occupies a substantial portion of the resonant cavity 3. Preferably, the dielectric constant is at least 2 and more preferably is 4 or higher in order to provide a significant reduction in the size of the cavity 3.

In the example shown, the microwave cavity 3 is cylindrical in shape and the bulb 9a is positioned and supported within the resonant cavity 3 by the dielectric material 24. The material 24 fills a substantial portion of the microwave cavity 3 between the bulb 9a and the waveguide 25. Advantageously, the diameter of the cavity 3 may be made substantially smaller than a comparable air filled cavity while still supporting a desired resonant mode.

The dielectric material may be a solid or a liquid, and it preferably has a dielectric constant greater than 4. The dielectric material preferably fills substantially the entire region in the cavity between the coupling means and the bulb.

In the example shown in FIG. 4, the dielectric material fills the entire region between the coupling means and the bulb. In this example, the dielectric material is a dielectric block 24 having a semi-spherical recess 26, on which the bulb 9a rests. The bulb 9a may be secured to the dielectric block by an optically transparent cement.

As mentioned above, another advantage of the present aspect of the invention is that it is capable of enabling more efficient light extraction from the bulb.

In accordance with the invention, the dielectric material 4 may be selected to have a high optical reflectivity in a preferred region of the spectrum. For example, if the spectral region of interest is the visible region, the dielectric material may be selected to have a reflectivity exceeding 85% and preferably greater than 98%.

Another concern is heat dissipation, since electrodeless lamps are known to run very hot, and sometimes require forced air cooling. In accordance with the present invention, the dielectric material may be selected to either be a good absorber of heat so as to act as a good heat sink material and/or to have high thermal conductivity to draw heat away from the bulb.

A preferred solid material which may be used as the dielectric material is boron nitride (BN). It has a dielectric constant of 4.1 and good optical reflectivity and thermal conductivity characteristics. Additionally, it is substantially transparent to microwave energy, so it does not significantly impede power transfer to the fill.

SECOND EXAMPLE

It may be advantageous to rotate the electrodeless bulb during operation, to promote a stable light output as well as temperature equalization around the bulb. In the second example depicted in FIG. 5, the lamp is substantially identical to the first example except that the bulb 9b is supported on a stem 27 and the dielectric material 24b provides clearance for the bulb 9b to rotate and a hole adapted to receive the stem 27. The stem 27 is coupled to a motor 28 which rotates the bulb 9b during operation. Alternative arrangements for rotating the bulb include positioning the stem at 90° to the position illustrated in FIG. 5, in which case a groove or channel would be provided in the dielectric material instead of the hole. Also, the stem may be oriented at angles which are not orthogonal to the axis of the cavity (e.g. between 30° and 60° off-axis), in which case a suitable off-axis hole through the material 24b adapted to receive the stem would be provided.

Figure 5:
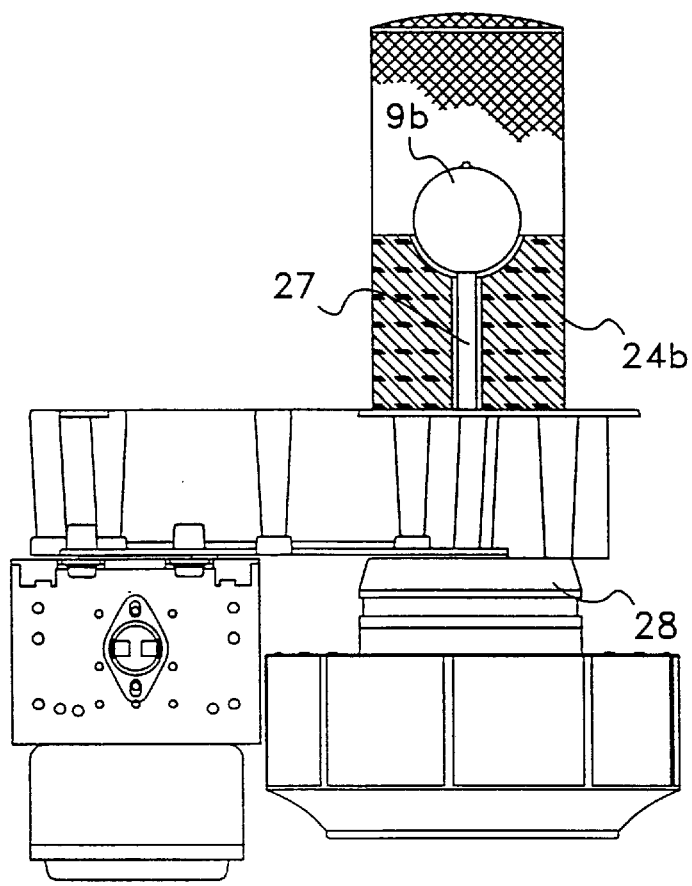
FIG. 5 is a schematic, partial cross sectional view of a second microwave discharge lamp with a dielectric loaded microwave cavity according to an aspect of the invention.

Many electrodeless lamps are designed for an operating frequency of 2.45 GHz. At this frequency, the smallest hollow cylindrical pipe which can carry the electromagnetic waves is 72 mm in diameter. This is also the smallest possible diameter for a hollow resonant cavity. By disposing BN in the microwave cavity, for example as shown in FIG. 5, a microwave discharge lamp according to the present aspect of the invention utilizes a resonant cavity with a diameter of 51 mm which provides stable operation with a sulfur fill at 2.45 GHz. The present aspect of the invention may be beneficially utilized for electrodeless lamps having resonant cavities adapted for other frequencies including RF and also frequencies higher than microwave frequencies.

Reflectors

According to another aspect of the invention, a reflector having a simple construction is disposed within the microwave cavity and defines a reflective cavity which encompasses the bulb within its volume and has an inside surface area which is sufficiently less than an inside surface area of the microwave cavity to cause an increase in the amount of light exiting the reflective cavity. By reducing the inside surface area of the reflective cavity relative to the microwave cavity, the number of reflections inside the cavity and corresponding losses are reduced, thereby improving the efficiency of the system. The reflector is typically detached from the bulb (which may rotate) and the extraction envelope defined by the reflector extends the aperture from the bulb up to the light transmissive end of the microwave cavity. Advantageously, the use of this type of internal reflector avoids the need for an optically transparent microwave screen (except in the area of the aperture) and an external reflector with the bulb at the focal point. A transparent screen is still used at the top of the microwave cavity, but this position is relatively distant from the thermal load of the bulb and, as noted below, appropriate measures may be taken to protect the screen from degradation.

For example, according to the invention, a reflector is disposed within the microwave cavity and around the bulb with at least a portion of the reflector spaced from a wall of the microwave cavity. Preferably, the bulb is uncoated or only partially coated (e.g. $2\pi$ steradian or less), thereby reducing manufacturing complexity. Preferably, the reflector is made from a non-conductive, highly reflective material. More preferably, the reflector material also has low microwave losses to minimize the effect the material may have on coupling the microwave energy to the fill. Suitable reflector materials include, for example, silica and alumina or combinations thereof.

THIRD EXAMPLE

FIG. 6 is a fragmented, cross-sectional view of a third example of a microwave discharge lamp according to the invention. The magnetron, waveguide, and power supply (not shown) are conventional components such as, for example, those components utilized in the above-referenced Light Drive® 1000. A bulb 29 is disposed in a microwave cavity 31. The microwave cavity 31 is defined by a cylindrical metal tube 33 which is open on one end which mounts to the waveguide housing over a coupling slot (not shown) and is closed on the other end 35 except for an aperture 37. A screen or mesh 39 covers the aperture 37 to contain the microwave energy within the microwave cavity 31 while allowing light to escape. A reflector 41 is disposed around the bulb 29 and spaced from the walls of the microwave cavity 31 except in the region of the aperture 37.

The metal tube 33 has a length and inside diameter to provide a desired microwave resonance mode. For example, a length of about 125 mm (5 inches) and an inside diameter of about 75 mm (3 inches) supports a preferred $TE_{111}$ resonance mode, although dielectric loading from the reflector 41 may result in small changes to these dimensions. Advantageously, according to the invention, the metal tube 33 and closed end 35 are structurally rigid and highly resistant to deformation. The walls of the metal tube 33 may be relatively thick to enhance cooling. The metal tube 33 and closed end 35 may be stamped or cast into a one-piece structure. Alternatively, the closed end 35 may be integrally joined to the metal tube 33 by welding or other conventional means.

As compared to conventional microwave discharge lamps, the lamp of the present invention provides an electromagnetic and optical design which is more readily adapted for effective thermo-mechanical packaging. For example, the mesh screen of the LightDrive® 1000 may reach local temperatures as high as about 600° C. under operating conditions. Advantageously, the metal tube 33 can conduct the thermal load from the bulb while operating at a temperature of less than 200° C., and typically about 150° C.

The mesh 39 is a relatively low density, fine wire gauge mesh which intercepts only a small fraction of light exiting the aperture. Because the microwave fields are lower at this end of the microwave cavity, the density of the mesh 39 may be lower as compared to, for example, the mesh 7 used along the cylindrical walls of the cavity, as shown in FIGS. 1 and 2. If necessary or desirable, the mesh 39 may be prepared with a protective coating which is effective to inhibit degradation of the screen at high temperatures as described in PCT Publication No. WO 98/56213.

The reflector 41 is a cylindrical ceramic tube which is open on one end and closed on the other end 43 except for an optional opening for the bulb stem. In lamp systems which do not require or benefit from bulb rotation, the closed end 43 is completely closed and the reflector 41 is adapted to support the bulb 29 at the desired location in the microwave cavity 31. An outer diameter of the reflector 41 is closely matched to an inner diameter of the aperture 37. As shown in FIG. 6, the cylindrical wall of the reflector 41 is closely spaced to the bulb 29 while the closed end 43 is not closely spaced to the bulb 29. As is apparent from FIG. 6, the inside surface area of a reflective cavity 45 defined by the reflector 41 is significantly less than an inside surface area of the microwave cavity 31.

The reflector 41 is formed, for example, as described in the '091 patent or PCT Publication No. WO 99/36940, each of which is incorporated herein by reference. The reflector material may be alumina or silica or combinations thereof. For example, the reflector 41 may be made of an alumina/silica combination of 90% alumina and 10% silica with a desired porosity. The reflector 41 may be fabricated in a mold, and may be mass produced with known ceramics technology. Advantageously, an alumina reflector is highly reflective (e.g. >98%) and maintains its high reflectivity even at temperatures in excess of 1000° C.

Alternatively, the reflector 41 may comprise a combination of diffuse and specular reflecting materials. For example, a thin (e.g. about 100 nm) coating of silver or aluminum protected by a 500 nm coating of alumina may be utilized over the last few centimeters of the reflector 41 nearest the aperture 37. The combination of the lower microwave fields at this end of the microwave cavity 31 and the thickness of the metal being much less than a skin depth enables the specular material to absorb little microwave power. The distance from the bulb enables the material to withstand the heat generated by the bulb.

FIG. 7 is a fragmented, cross-sectional view of a first alternative reflector configuration for the third example. In FIG. 7, a reflector 51 is similar to the reflector 41, except that a closed end 53 of the reflector 51 is closely spaced to the bulb 29. As compared to the reflector 41, the reflector 51 further reduces an inside surface area of a reflective cavity 55 defined by the reflector 51 and thereby reduces reflection losses.

The discharge lamp illustrated in FIG. 7 also includes a light transmissive cover 57 disposed over the aperture 37 and mesh 39. For example, such a cover 57 may be provided by a fused quartz disc or plate. The cover 57 reduces the amount of dust or other contaminants which might enter the microwave cavity 31 through the mesh 39. Alternatively, the mesh 39 may be embedded in the cover 57.

FIG. 8 is a fragmented, cross-sectional view of a second alternative reflector configuration for the third example. In FIG. 8, a reflector 61 is similar to the reflector 51, except that a closed end 63 of the reflector 61 is hemispherically shaped and closely spaced to the bulb 29. As compared to the reflector 51, the reflector 61 further reduces an inside surface area of a reflective cavity 65 defined by the reflector 61 and thereby reduces reflection losses. The lamp in FIG. 8 includes a light transmissive cover 67 with a screen or mesh embedded therein (shown schematically).

FIG. 9 is a fragmented, cross-sectional view of a third alternative reflector configuration for the third example. A reflector 71 has a relatively thick closed end 73 and outwardly tapered side walls 75. As noted above, a substantial amount of dielectric material in the microwave cavity may alter the resonance mode support by the cavity. Accordingly, the height and/or diameter of the cavity may be reduced to support the desired microwave resonance mode. The bulb 19a is positioned relatively closer to the aperture 37, thereby reducing the inside surface area of the reflective cavity and reducing reflection losses. In FIG. 9, the bulb stem is eliminated and the bulb 19a does not rotate. Advantageously, the size and shape of the reflector 71 are utilized to improve the thermal conductivity of the reflector 71 for thermal management purposes. An optional specularly reflective thin film coating 77 covers the last few centimeters of the reflector 71. Of course, these features and advantages are also applicable to lamps with rotating bulbs.

FIG. 10 is a fragmented, cross-sectional view of a fourth alternative reflector configuration for the third example. A reflector 81 has a simple construction of a cylindrical ceramic tube open at both ends. The bulb 19b bears a reflective coating over $2\pi$ steradian on a side of the bulb opposite the aperture 37 to direct light into the reflector 81 and through the aperture 37. For example, the reflective coating may comprise a dichroic coating which is highly reflective throughout at least the ultraviolet and visible region. Alternatively, the bulb 19b may comprise a composite bulb having a reflective ceramic portion and a light transmissive portion as described in PCT Publication No. WO 98/53475, which is hereby incorporated by reference in its entirety.

In each of the alternative constructions of the third example, the absolute amount of light output from the aperture may be lower than the absolute amount of light produced by a non-aperture system. However, the amount of useful light which can be efficiently collected and utilized by a lighting system is expected to be increased.

As is apparent from the foregoing description and data, the microwave discharge lamp according to the invention provides more directional light output than conventional isotropic light sources. Because the light exits at a narrower beam angle, the light is efficiently coupled into optical elements, such as a tapered light pipe, a compound parabolic collector, a ball lens, and other reflectors or lenses. With any of these optical systems, the lamp according to the invention is expected to provide better light collection efficiency than can be obtained with conventional isotropic sources.

FOURTH EXAMPLE

Figure 11:
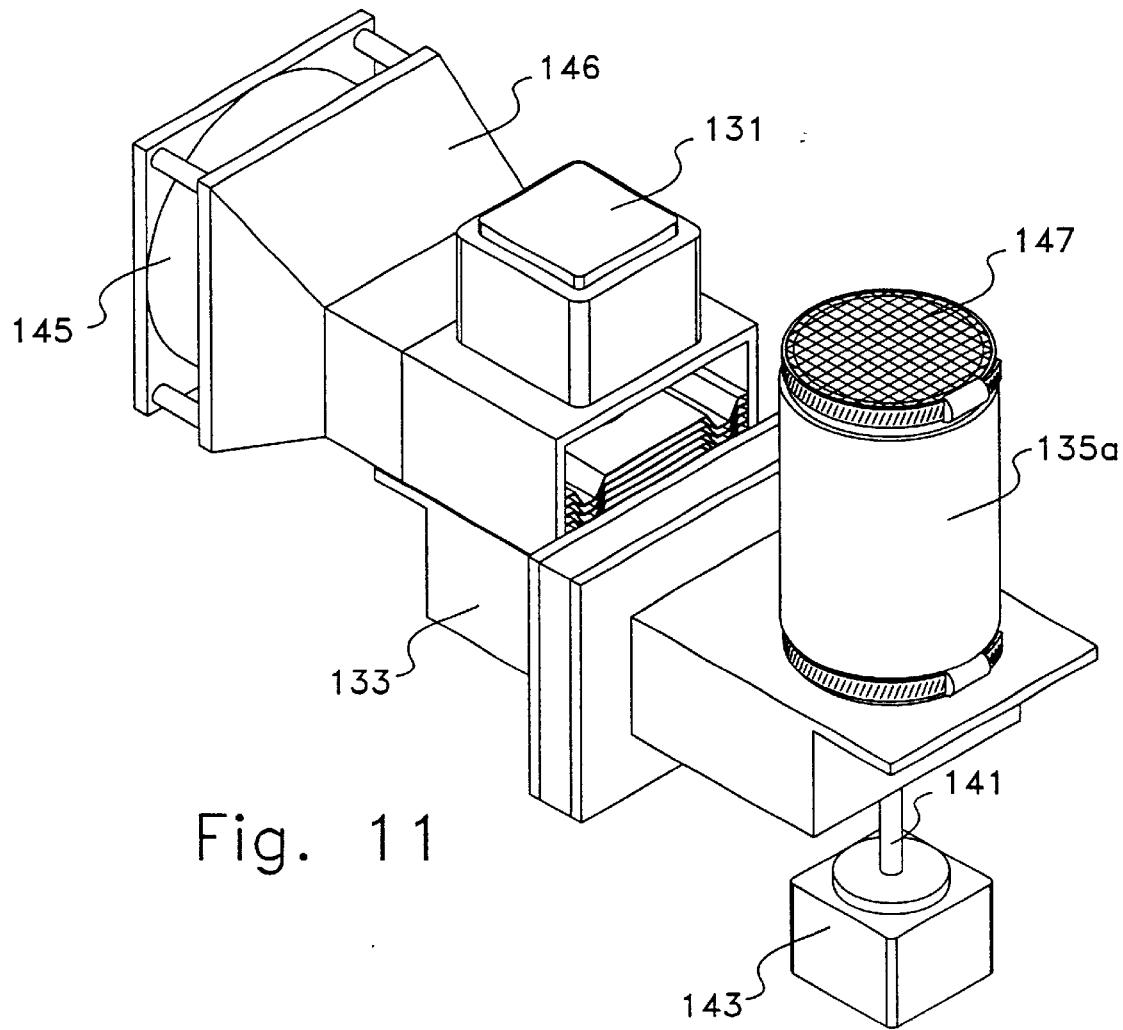
FIG. 11 is perspective view of a fourth microwave discharge lamp according to the invention.
Figure 12:
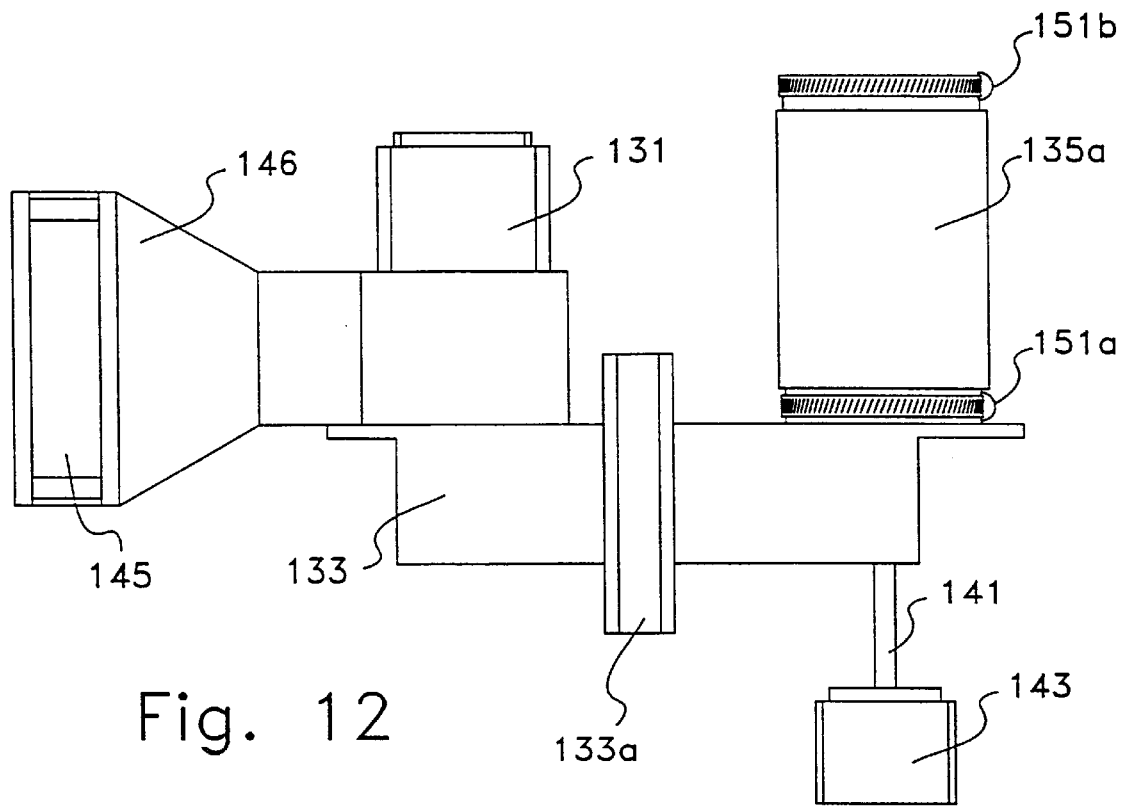
FIG. 12 is a schematic view of the lamp according to the fourth example.
Figure 13:
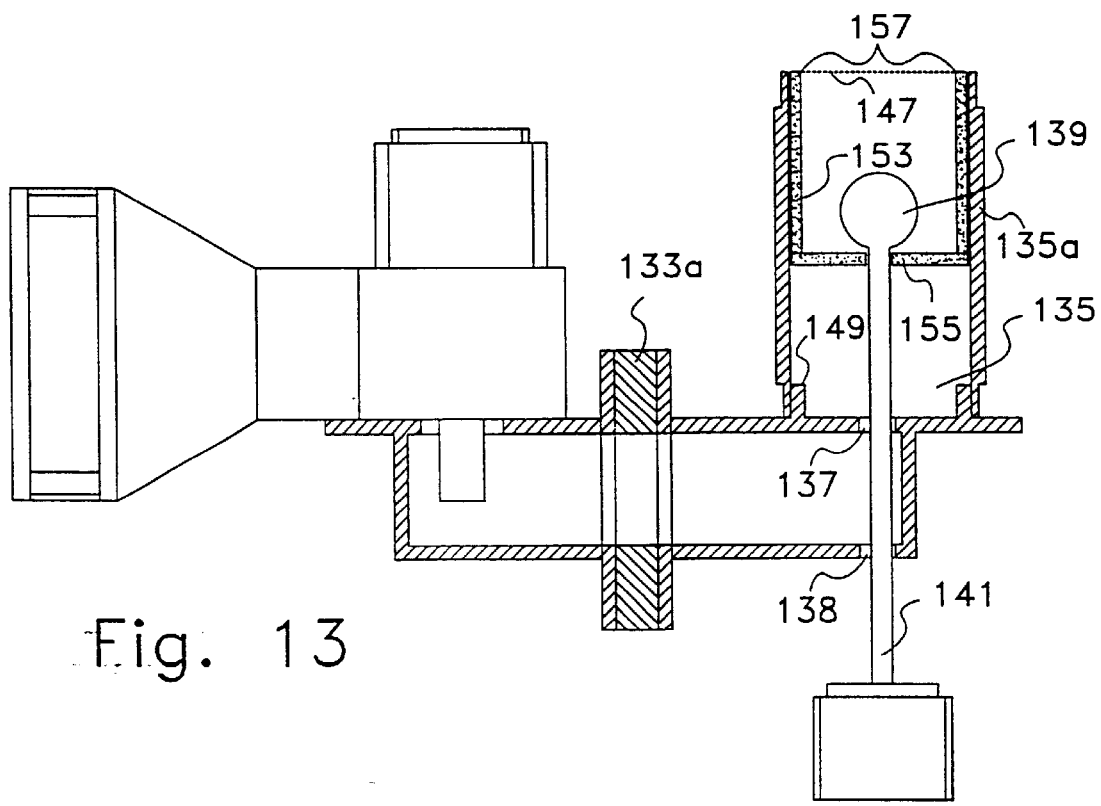
FIG. 13 is a schematic, partially cross-sectional view of the lamp according to the fourth example.

FIG. 11 is perspective view of a fourth example of a microwave discharge lamp according to the invention. FIG. 12 is a schematic view of the lamp according to the fourth example. FIG. 13 is a schematic, partially cross-sectional view of the lamp according to the fourth example.

With reference to FIGS. 11–13, a magnetron 131 provides microwave energy to a waveguide 133. The waveguide 133 utilizes a standard waveguide dimension of 86 mm by 43 mm (3.4" by 1.7") and has a length determined by straightforward tuning process. The waveguide 133 includes a spacer 133a with a thickness determined to provide the waveguide 133 with the desired overall length (in production the spacer 133a is not needed). The energy is directed into a microwave cavity 135 through a coupling slot 137. A bulb 139 is disposed within the cavity 135. The bulb 139 is supported on a stem 141 which is coupled to a motor 143.

The bulb stem 141 passes through the coupling slot 137 (which is an elongated opening) and another opening 138 in the waveguide 133. The opening 138 is just slightly larger than the stem 141 and below cutoff at the magnetron frequency. A low friction bushing or sealed ball bearing (not shown) may be disposed on the stem 141 and through the hole 138 to seal out dust or other contaminants from the waveguide 133. A fan 145 provides cooling air to the magnetron through an air duct 146.

Alternatively, the bulb stem may pass through an opening into the microwave cavity other than the coupling slot. Numerous such alternative arrangements are known in the art. A preferred alternative arrangement for the bulb stem and motor is as utilized in the above-mentioned Light-Drive® 1000, wherein a separate opening into the microwave cavity is provided adjacent to the coupling slot and the bulb stem is disposed outside of the waveguide.

The microwave cavity 135 is defined by a substantially cylindrical tube 135a which is bounded on one end by a conductive surface of the waveguide 133 which defines the coupling slot 137 and is bounded on the other end by a screen or mesh 147. The tube 135a is mounted on a mating flange 149 on a top surface of the waveguide housing and secured thereto by a clamp 151a. The mesh 147 is secured to the tube 135a by a clamp 151b. The mesh 147 is light transmissive while containing the microwave energy. The tube 135a and its bounding surfaces define a microwave cavity designed to support a microwave resonance mode during lamp operation. Preferably, for example, the tube 135a has the previously mentioned dimensions to support a $TE_{111}$ resonance mode.

As shown in FIG. 13, a reflector 153 is generally cylindrically shaped with an outer diameter corresponding closely to an inner diameter of the microwave cavity 135. The reflector 153 is closed on one end 155 (except for a hole which accommodates the bulb stem 141) and open on the other end 157. The open end 157 of the reflector 153 defines an aperture through which light exits the microwave cavity 135.

In the fourth example, the open end 157 of the reflector 153 is substantially aligned with the end of the tube 135a and the closed end 155 of the reflector 153 is spaced from the end of the tube 135a and in close proximity to the bulb 139. By moving the closed end 155 closer to the bulb 139, the inside surface area of the reflective cavity is reduced. As is apparent from FIG. 13, the inside surface area of the reflective cavity is significantly less than the inside surface area of the microwave cavity 135, exclusive of the aperture area 157.

Surprisingly, brightness is dependent primarily on the size of the output aperture and does not require the reflective material to be closely spaced to the bulb. By covering the reflective cavity with a reflective ceramic disc having a choked down aperture, similar brightness may be achieved with the example of FIG. 13 as is achieved with the examples of FIGS. 6–10. However, the structure of the present example is of simpler construction as compared to the aperture structures shown in FIGS. 6–10 and provides better thermal management characteristics. Thus manufacturing costs are significantly reduced while preserving a desired brightness.

A suitable material for the reflector 153 is alumina felt which is commercially available from Cotronics Corporation, Brooklyn, N.Y., USA, as part number 300A (ceramic paper). The alumina felt consists essentially of fibers of alumina ($Al_2O_3$) plus a binder which holds the fibers together as a cloth like material. The reflector 153 is constructed as follows. A disc-shaped piece of the felt material with an opening therethrough for the bulb stem is glued to a similarly proportioned quartz disc and positioned behind the bulb and forms the closed end 155. The diameter of the felt disc is sized to fit snugly against the cylindrical wall of the microwave cavity. A strip of the felt with a desired width and a length corresponding to the inner circumference of the microwave cavity is curled and placed inside the microwave cavity to form the cylindrical wall of the reflector. The felt used for the reflector 153 is about ⅛" thick with a measured reflectivity of about 92%. When fired at above about 900° C., the binder burns off leaving mostly pure alumina which is much less flexible and substantially self-supporting. As noted below, the reflector material preferably has a much higher reflectivity.

Figure 14:
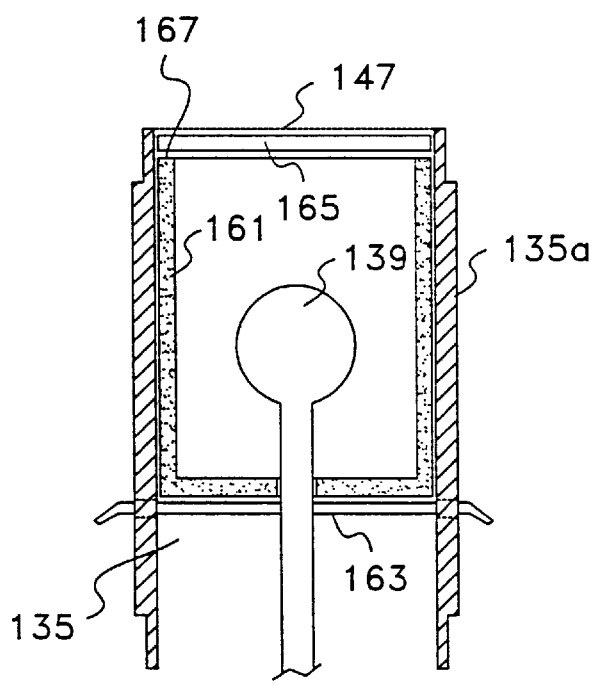
FIG. 14 is a schematic, cross-sectional view of a first alternative reflector configuration for the fourth example.

FIG. 14 is a schematic, cross-sectional view of a first alternative reflector configuration for the fourth example. A reflector 161 is a mold pressed ceramic cup, fabricated as described above with respect to FIGS. 6–10. The reflector 161 is a rigid, self-supporting structure with a measured reflectivity of about 98%. The reflector 161 is supported by one or more quartz rods 163 which, for example, extend through holes in the tube 135a. The ends of the quartz rods 163 are bent to keep the rods 163 in place. An outer diameter of the reflector 161 is slightly less than an inner diameter of a microwave cavity 135 so that the reflector 161 is readily slid into position in the cavity 135. The open end of the reflector 161 extends to near the light transmissive end of the cavity. A quartz disc 165 is press fit into the light transmissive end of the cavity 135 and over a shoulder 167 provided by the open end of the reflector 161. The disc 165 effectively seals out dust and other contaminants from the cavity 135. The mesh 147 covers the quartz disc 165.

As compared to the example shown in FIG. 14, the reflector 161 is more reflective and thereby provides more efficient light output. Also, the ceramic material of reflector 161 has a higher thermal conductivity than the alumina felt so that the inner surface of the cavity is cooler. In order to provide good thermal contact throughout the operating range of the lamp, the reflector 161 may be configured with an outside diameter that closely corresponds to the inside diameter of the tube 135a and is slip fit into the tube 135a at a temperature which is higher than the maximum operating temperature of the tube 135a. Upon cooling, the assembly provides a snug fit with good thermal contact. Preliminary thermal cycling tests indicate that the assembly is robust enough to remain mechanically sound even at very low temperatures.

Figure 15:
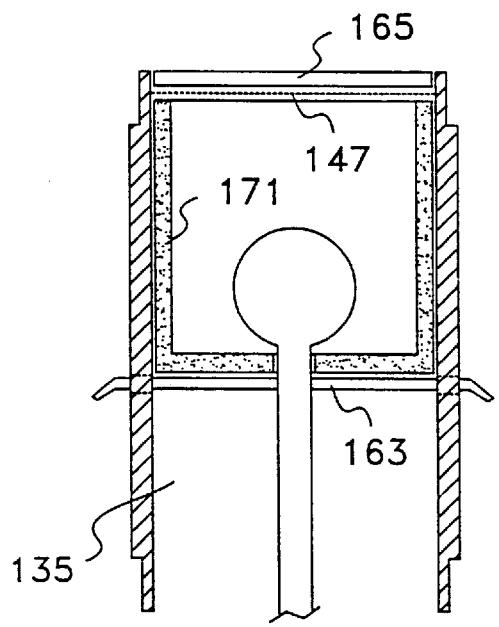
FIG. 15 is a schematic, cross-sectional view of a second alternative reflector configuration for the fourth example.

FIG. 15 is a schematic, cross-sectional view of a second alternative reflector configuration for the fourth example. A reflector 171 is of similar construction to the reflector 161, except that a closed end of the reflector 171 is closely spaced to the bulb 139. Also, in this configuration the position of the mesh 147 and the quartz disc 165 are reversed.

Figure 16:
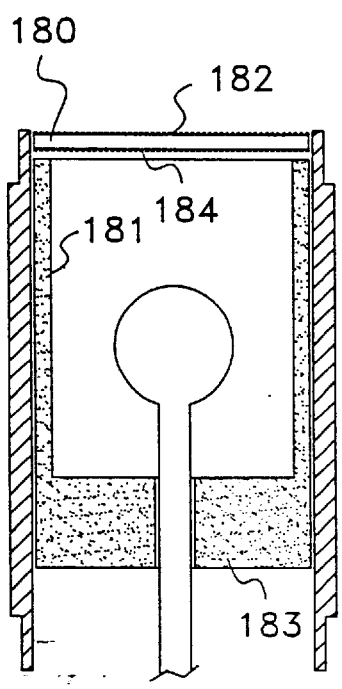
FIG. 16 is a schematic, cross-sectional view of a third alternative reflector configuration for the fourth example.

FIG. 16 is a schematic, cross-sectional view of a third alternative reflector configuration for the fourth example. A cover disk 180 includes two embedded conducting meshes 182 and 184 disposed on opposite sides of the disk 180. The tube 135a and the disk 180 form a mechanical and electromagnetic seal around the bulb 139. Preliminary tests indicate that the two successive screens separated by a significant layer of dielectric (e.g. quartz) dramatically cut the EMI from the lamp to the extent that further shielding is not necessary. Advantageously, any further optical elements utilized to manipulate light from the disk 180 are independent of the thermal and electromagnetic shielding requirements of the lamp. For a particular microwave cavity size and aperture size, there may be a tradeoff between mesh size (i.e. wire spacing), mesh conductance, and microwave leakage through the mesh. According to a present aspect of the invention, the mesh need not be mechanically self-supporting as is required in conventional microwave discharge lamps. Instead, the meshes 182, 184 can be extremely fine gauge conductive material which is deposited on both sides of the disk 180. For example, the meshes can be screen printed or optically patterned onto the disk using lithographic techniques. Alternatively, a macroscopic mesh can be embedded in glass frit. The deposited material may then be protected by the addition of a glass sealing layer. Advantageously, the cover disk 180 provides a higher degree of EMI shielding with a lower light loss penalty than convention microwave cavity mesh screens.

If necessary or desirable, the disk 180 may be prepared with a dichroic coating which selectively passes light of desired wavelengths, polarization, or other characteristics. As described in the '091 patent, the unwanted components of light may be reflected back to the fill for absorption and re-emission, thereby recycling the unwanted light and improving the efficiency of the system. Also advantageously, the disk 180 may comprise a lens or other optical element for manipulating the light exiting the aperture. For example, a plano-convex lens made from quartz can handle the temperatures present at that end of the microwave cavity and may be processed as described above to include the two conductive meshes 182, 184.

A hot spot may develop on the reflectors 161, 171 in the centermost region (e.g. around the bulb stem) of the closed end nearest to the bulb. According to a present aspect of the invention, a closed end portion 183 of the reflector 181 is made thicker than the cylindrical wall portion to improve the axial and radial heat flow in the centermost region of the end portion 183. If necessary or desirable, the end portion 183 may be extended to contact the bottom of the cavity. As noted above, a significant amount of dielectric material in the cavity may require appropriate adjustment of the dimensions of the cavity.

Figure 17:
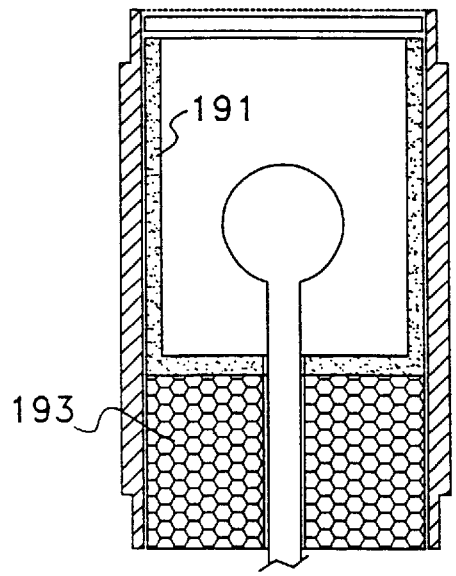
FIG. 17 is a schematic, cross-sectional view of a fourth alternative reflector configuration for the fourth example.

FIG. 17 is a schematic, cross-sectional view of a fourth alternative reflector configuration for the fourth example. A reflector 191 is similar to the reflector 161, except that the reflector 161 is supported by an annulus of a second dielectric material 193. The second material 193 aids in heat transfer conduction. Advantageously, the second material 193 need not be the same material as the reflector 191 and may instead be chosen without regard to its optical characteristics. For example, the reflector 191 may comprise high reflectivity alumina and the second material 193 may comprise boron nitride. As noted above, a significant amount of dielectric material in the cavity may require appropriate adjustment of the dimensions of the cavity.

Figure 18:
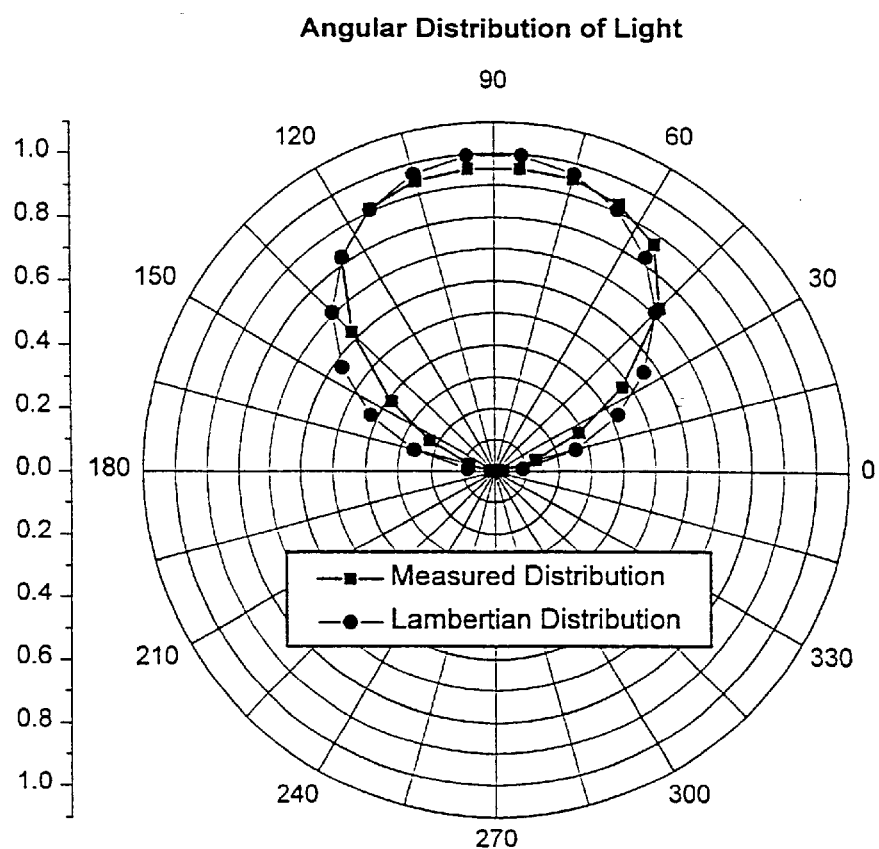
FIG. 18 is a polar graph of light intensity versus angle of measurement.

FIG. 18 is a polar graph of light intensity versus angle of measurement. The lamp configuration used for the measurement most closely corresponds to the configuration shown in FIG. 14. The bulb is a spherical bulb having an outer diameter of about 35 mm and an inner diameter of about 33 mm. The bulb is filled with 26 mg of sulfur, 50 Torr Argon, and a small amount of $Kr_{85}$. The inside diameter of the reflective cavity is about 69 mm. Of course the invention is not limited to this specific example. Any bulb and fill combination adapted to provide useful light output may be utilized in a suitably configured microwave cavity and reflective cavity. Exemplary alternative fills include, selenium, tellurium, metal halides including indium halide, and mercury based fills.

The Lambertian factor is determined as follows:

$$F_l = \frac{\pi E_0 r^2}{2\pi r r^2 \int E(\theta)\sin\theta d\theta} = \frac{E_0}{2\int_0^{\pi/2} E(\theta)\sin\theta d\theta} \quad \text{(Eq. 1)}$$

where $E_0=E(\theta=0)$ is the illuminance measured in a plane perpendicular to the axis of the longitudinal cavity.

For the above lamp configuration, the Lambertian factor is between about 0.79 and 0.81. The Lambertian factor is generally smaller with a smaller diameter cup and larger with a larger diameter cup. Generally, as the diameter is increased the brightness decreases. However, if the cup is too small the bulb may overheat and/or light may be trapped underneath the bulb and the bottom of the cup, which also decreases the brightness. Preferably, the Lambertian Factor is less than 1, which generally indicates that more of the light is emitted at small angles to the longitudinal axis of the cavity, as compared to a Lambertian source.

The light output from the aperture is a two dimensional, disk shaped output with high brightness. When combined with a suitable external reflector or other optics, a highly directional output (e.g. narrow light beam) may be provided. Such a high brightness, planar output is well suited for driving light pipes or fiber optic bundles. A highly directed beam is particularly useful when propagated over long distances using shallow angle or "glint" reflection as described in the above-mentioned '245 application.

Figure 19:
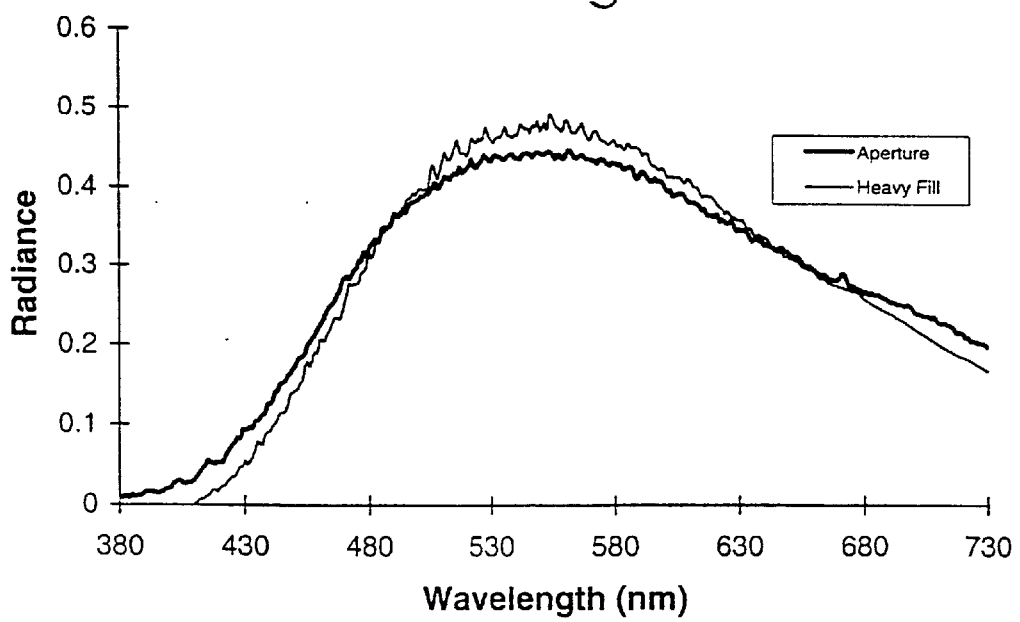
FIG. 19 is a graph comparing the spectral distribution of a microwave discharge aperture lamp according to the present invention against a conventional microwave discharge lamp.

FIG. 19 is a graph comparing the spectral distribution of a microwave discharge aperture lamp according to the present invention against a conventional microwave discharge lamp. The conventional lamp utilizes a sulfur bulb with a relatively high fill density in order to provide a correlated color temperature (CCT) which is substantially the same as the CCT produced by the lamp of the present invention. As is apparent from FIG. 19, the spectrum produced by the present lamp is a broader spectrum with more blue and red from as compared to the conventional lamp, even though the color temperatures are about the same.

Sealed System

The inventors have observed that environmental contamination has an adverse effect on microwave lamp operation and lifetime. Empirical data from highly accelerated life tests suggests that a sealed system providing a substantially non-contaminated operating environment may provide a lifetime several times longer than a comparable non-sealed system. Several examples of sealed microwave cavities are given above.

FIFTH EXAMPLE

FIG. 20 is a schematic, cross-sectional view of a fifth example of a microwave discharge lamp according to the invention. FIG. 21 is an enlarged view of the area 21 in FIG. 20. A light transmissive threaded "ball jar" cover 201 is used to seal the microwave discharge lamp. A cylindrical metal tube 203 defines a microwave cavity 205. The tube 203 is cast or machined to provide a threaded portion 207 which mates with the threaded cover 201. A bulb 209 surrounded by a self supporting reflector 211 is disposed within the cavity 205. The tube 203 provides a shoulder 213 in the region of the threaded portion 207. A quartz disc 215 is positioned on the shoulder 213 and covered with a conductive screen or mesh 217. An o-ring 219 having an outer diameter slightly less than an outer diameter of the shoulder 213 is positioned between the screen 217 and the cover 201.

The o-ring 219 is compressed by the cover 201 and holds the screen 217 in place which in turn holds the quartz disc 215 in place. Suitable materials for the o-ring 219 include Nickel/graphite filled silicone. A sealed microwave cavity significantly reduces the possibility of contamination and also provides a good electromagnetic seal.

Self-extinguishing lamps utilizing fail-safe fuses and disabling circuitry are described for example, in U.S. Pat. Nos. 4,013,919, 4,361,782, 4,376,259, and 4,752,718, each of which is incorporated herein by reference. Other self-extinguishing lamps are known in the art and are commercially available from General Electric Company under the brand name Saf-T-Gard® and from Philips under the brand name Safety Lifeguard™. Conventionally, these types of fail-safe arrangements have been used to detect the breakage of the outer envelope of a high intensity discharge lamp with potentially harmful UV light output.

Microwave discharge lamps are preferably configured to minimize RF interference and other potential leakage of microwaves. The cover 201 preferably comprises microwave absorbing glass and serves as a secondary RF seal for the lamp (where the primary seal is the screen 217). The cover 201 also protects the screen 217 and disc 215 from damage. An interior volume 221 between the cover 201 and the disc 215 is evacuated of oxygen and may be filled with an inert gas. According to the invention, a fail-safe fuse 223 is disposed in the space 221 and is electrically connected to suitable circuitry for disabling the microwave lamp if either the cover 201 or disc 215 are punctured or otherwise broken. For example, the fail-safe fuse 223 may be similar to those described in the above-referenced self-extinguishing lamp patents and commercially available lamps. The fail-safe fuse 223 may be connected in series with a power source for the lamp, thereby disabling the lamp when the fuse 223 fails to conduct. Preferably, the fuse 223 is part of a control circuit which detects a condition of the fuse 223 and automatically shuts off the lamp when the condition of the fuse 223 indicates that the seal has been broken.

FIG. 22 is an enlarged view of a first alternative configuration for the fifth example. A cylindrical metal tube 203a is machined or cast to have a threaded portion 207 and also to define a channel 207a having a wall portion 207b. A quartz disc 215a is positioned in the tube 203a in the area of the wall portion 207b of the channel 207a. The disc 215a is also supported by the reflector 211. A screen 217a covers the disc 215a and extends into the channel 207a where it is secured by the cover 201 compressing the o-ring 219.

Magnetron Cooling

Microwave discharge lamps typically use a magnetron to generate microwave energy. The magnetron is potentially the shortest lived component in the lamp system. The anode of the magnetron generates a significant amount of heat and must be cooled during operation. If the anode overheats, the useful life of the magnetron decreases significantly.

Figure 23:
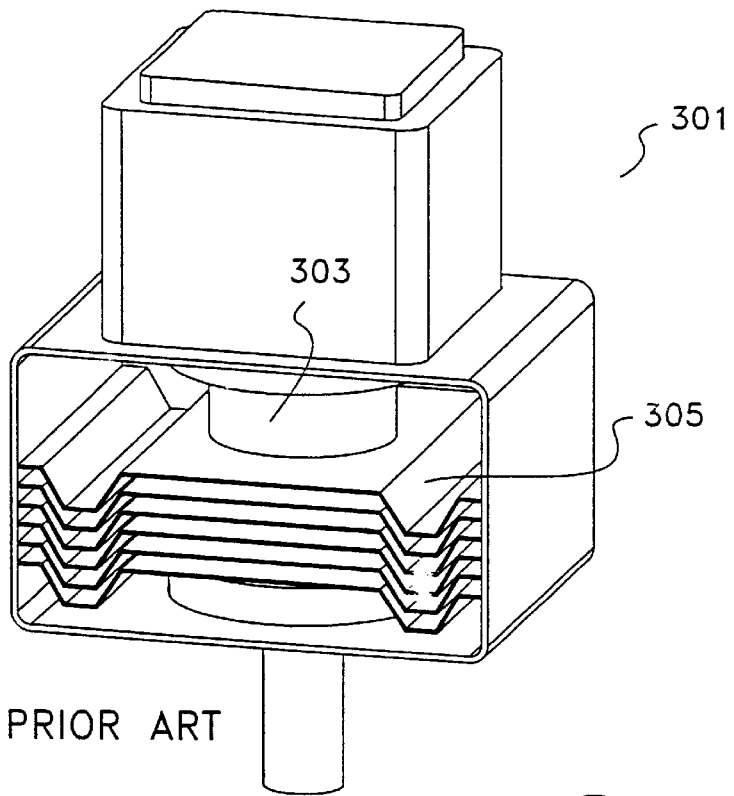
FIG. 23 is a perspective view of a conventional magnetron.

FIG. 23 is a perspective view of a conventional magnetron. The magnetron 301 includes an anode 303 which is in thermal contact with a plurality of cooling fins 305. During operation, air is moved across the cooling fins to provide convection type cooling. In an open (i.e. unsealed system) a sufficient amount of forced air convection cooling is readily provided to maintain the anode at a suitable operating temperature.

Figure 24:
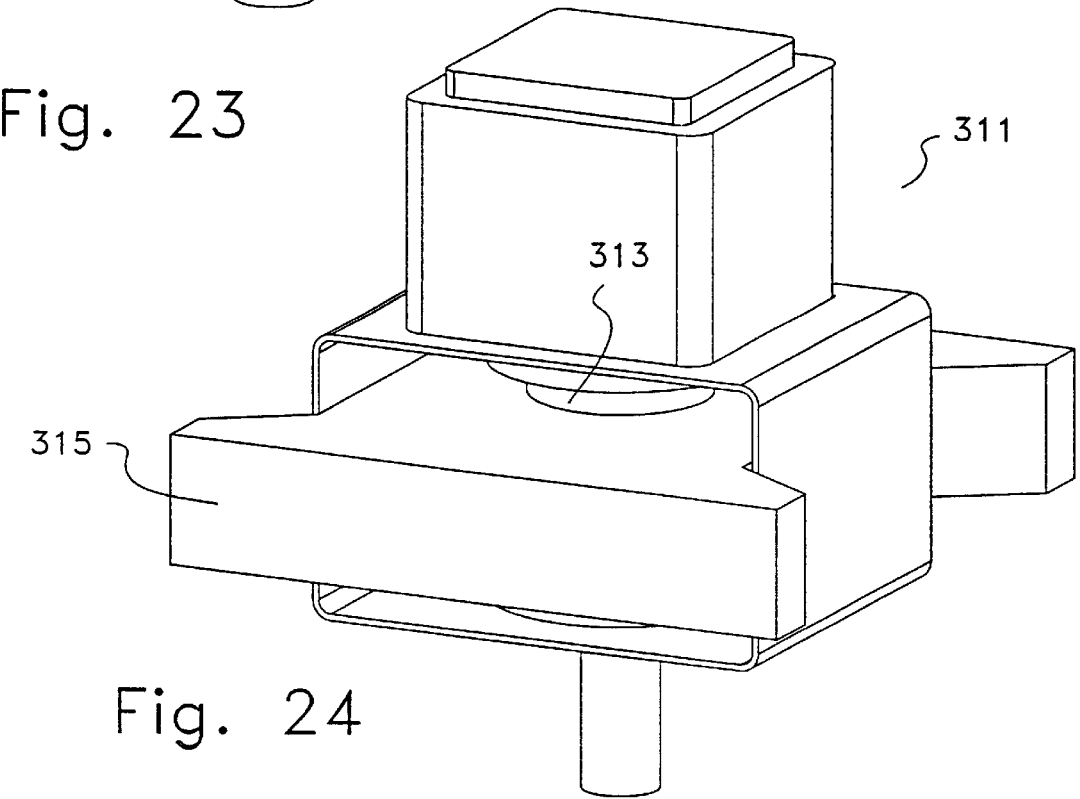
FIG. 24 is a perspective view of a magnetron according to the invention.

FIG. 24 is a perspective view of a magnetron according to the invention. A magnetron 311 includes an anode 313 which is in thermal contact with a thermally conducting material 315 configured for conductive heat transfer from the anode 313. The thermal conductor is made from, for example, aluminum or copper. Other thermally conducting materials may be used and the thermal conductor 315 may be used in combination with embedded heat pipes. The thermal conductor 315 is attached to the anode, for example, by press fitting, heat shrinking, soldering, brazing, or other conventional means.

In a sealed system with insufficient internal air flow for convection type cooling, the thermal conductor is preferably thermally connected to another heatsink configured for free convective and radiative heat transfer. The other heatsink may be part of the sealed lamp system, the system housing, or an external heatsink separate from the lamp. In certain applications, the brackets or other support structure for the lamp may be effectively utilized as external heatsinks for the sealed lamp system. For example, when such a lamp is used on a utility pole (e.g. for street lighting), the external heatsink may comprise the metal structure of the pole to effectively dissipate the heat from the anode. Advantageously, the reduced need for forced air cooling reduces the noise level during operation of the lamp by eliminating or reducing the size and/or speed of an internal fan used to provide such cooling.

Such conductive cooling of magnetrons may also be applied to other applications which require outdoor operation, harsh environments, or where noise or airborne contaminants are otherwise of concern.

SIXTH EXAMPLE

A sealed lamp system generates heat energy within a confined volume. The heat must be transported to the outside surfaces of the sealed system while maintaining all of the system components at acceptable temperatures. Preferably, components which are particularly heat sensitive are thermally isolated from the heat generating parts of the lamp system. These components must also receive their own adequate heatsinking.

According to the invention, the lamp system is divided into sealed sub-systems which inhibit infiltration of environmental contaminants, each with its own heatsink. Thermal breaks made from low thermal conductivity material separate the sub-systems. Another housing may contains all the sub-systems and optionally provides cooling air over exterior surfaces of the sealed sub-systems.

Figure 25:
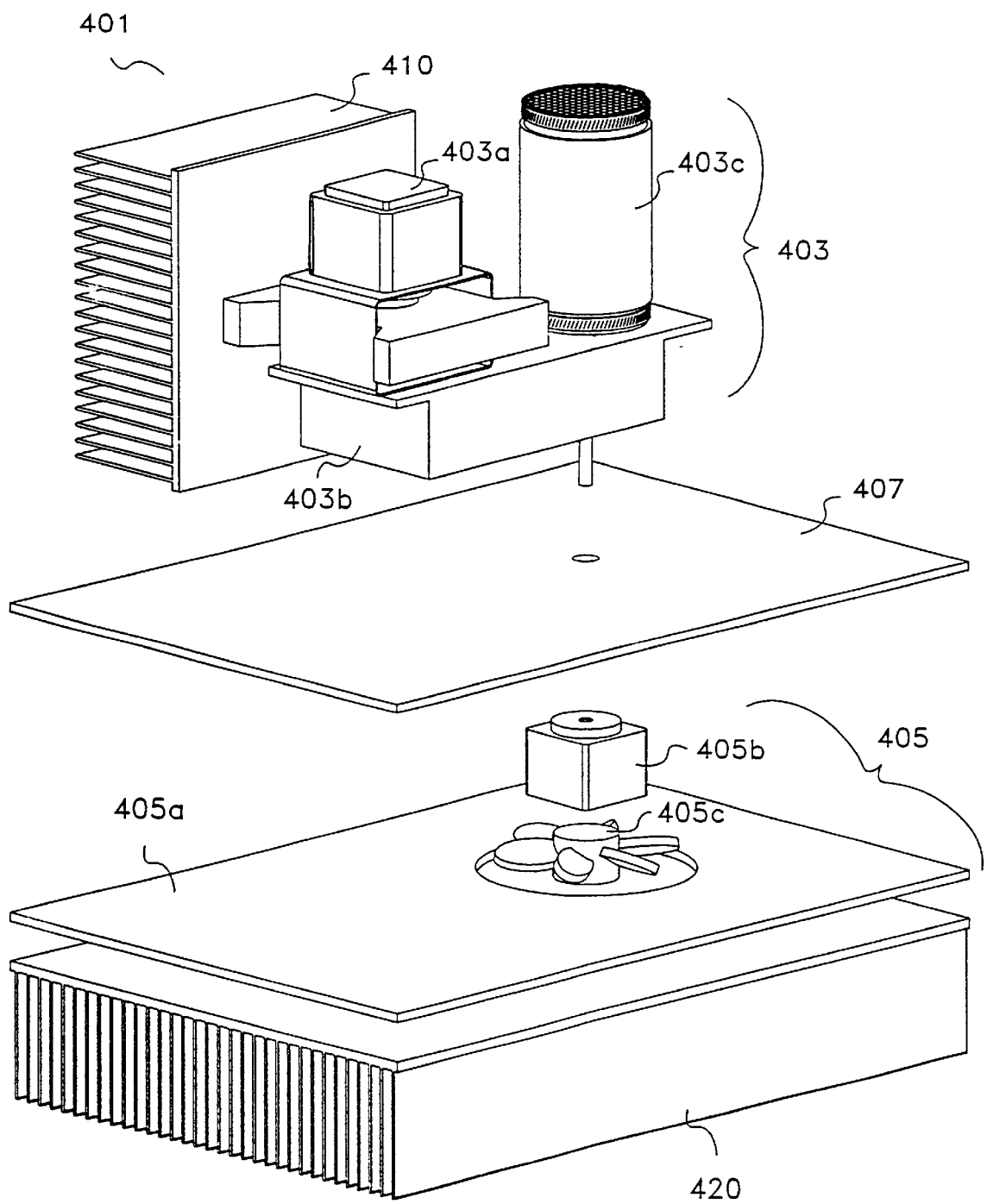
FIG. 25 is an exploded, perspective view of a sixth example of a microwave discharge lamp according to the invention.

FIG. 25 is an exploded, perspective view of a sixth example of a microwave discharge lamp according to the invention. A lamp system 401 includes a first sub-system 403 and a second sub-system 405 separated by a thermal barrier 407. The first sub-system 403 includes a magnetron 403a, a waveguide 403b, and a microwave cavity 403c (including the bulb). The second sub-system 405 includes a power supply circuit 405a, a motor 405b, and a fan 405c. The first sub-system 403 utilizes a first heat-sink 410. The second sub-system 405 utilizes a second heatsink 420. The thermal barrier 407 is preferably a stainless steel plate approximately 1.5–2.5 mm (0.06–0.1 inch) thick.

A preferred sealed lamp system according to the invention is similar to the system shown in FIG. 25, with the following differences. The magnetron, waveguide, and microwave cavity are disposed in an enclosed housing. Two oppositely disposed sides of the housing are comprised of heatsink assemblies similar to heatsink 410, except that the heatsinks run the entire length of the housing extending beyond the microwave cavity as well. Both sides of the magnetron anode heatsink are in thermal contact with the heatsink sides of the enclosure. A separate heatsink or extractor is also provided for the microwave cavity to conduct heat from the cavity wall to the heatsink sides of the enclosure. A top wall of the enclosure defines a hole which is aligned with and closely spaced to the light transmissive end of the micro cavity. A mounting plate for an external reflector is provided on the outside surface of the top wall. An oppositely disposed bottom wall of the enclosure comprises a plexiglass sheet about 6 mm (¼ inch) thick which functions as a thermal barrier.

A separate enclosure houses a power supply unit for the lamp and the motor for the bulb. In this preferred example, the motor rotates only the bulb and a separate electric fan circulates air within the separate power supply enclosure. The power supply board is mounted to a heatsink 420 as shown in FIG. 25. The lamp enclosure and the power supply enclosure are mechanically connected to each other and suitable electrical connections are provided therebetween. Another enclosure or shroud made from sheet metal is wrapped around the two assemblies and an external, weather sealed fan housed inside the shroud forces air through the exposed heatsink fins to improve cooling of the sealed lamp and power supply units. Little noise is generated because less forced air is required than conventional microwave discharge lamps.

It should be understood that the invention has been described in connection with illustrative examples and is not limited to these examples. Numerous variations will occur to those skilled in the art.

What is claimed is:

1. An electrodeless microwave discharge lamp, comprising:

a source of microwave energy;

a microwave cavity;

a coupling structure configured to transmit the microwave energy from the source to the microwave cavity;

a bulb disposed within the microwave cavity, the bulb including a discharge forming fill which emits light when excited by the microwave energy; and a reflector disposed within the microwave cavity and spaced from the bulb, wherein the reflector defines a reflective cavity which encompasses the bulb within its volume and a light emitting aperture, and wherein the reflective cavity has an inside surface area which is significantly less than an inside surface area of the microwave cavity, wherein a portion of the reflector defining the light emitting aperture extends from a position closely spaced to an exterior surface of the bulb to a light transmissive end portion of the microwave cavity, and wherein an inner diameter of the reflector is slightly larger than an outer diameter of the bulb.

2. The electrodeless lamp as recited in claim 1, wherein the reflector comprises a hollow cylinder of reflective material which is open on both ends and the bulb is adapted to reflect light into the hollow cylinder.

3. An electrodeless microwave discharge lamp, comprising:

a source of microwave energy;

a microwave cavity;

a coupling structure configured to transmit the microwave energy from the source to the microwave cavity;

a bulb disposed within the microwave cavity, the bulb including a discharge forming fill which emits light when excited by the microwave energy; and a reflector disposed within the microwave cavity and spaced from the bulb, wherein the reflector defines a reflective cavity which encompasses the bulb within its volume and a light emitting aperture, and wherein the reflective cavity has an inside surface area which is significantly less than an inside surface area of the microwave cavity, wherein a portion of the reflector defining the light emitting aperture extends from a position closely spaced to an exterior surface of the bulb to a light transmissive end portion of the microwave cavity, and wherein the reflector comprises a hollow cylinder of reflective material which is open on one end and substantially closed on the other end, wherein the open end defines the light emitting aperture.

4. The electrodeless lamp as recited in claim 3, wherein the bulb is attached to a stem and wherein the substantially closed end comprises an opening adapted to receive the stem.

5. The electrodeless lamp as recited in claim 3, wherein the closed end is spaced away from the bulb.

6. The electrodeless lamp as recited in claim 3, wherein the closed end is closely spaced to the bulb.

7. The electrodeless lamp as recited in claim 3, wherein the bulb is spherically shaped and the closed end is hemispherically shaped and closely spaced to the bulb.

8. The electrodeless lamp as recited in claim 3, wherein the closed end is relatively thicker than the walls of the cylinder to promote heat transfer from the bulb.

9. The electrodeless lamp as recited in claim 3, wherein the reflector is made from a non-conductive and highly reflective material.

10. The electrodeless lamp as recited in claim 9, wherein the material comprises silica or alumina or a combination thereof.

11. An electrodeless microwave discharge lamp, comprising:

a source of microwave energy;

a microwave cavity;

a coupling structure configured to transmit the microwave energy from the source to the microwave cavity;

a bulb disposed within the microwave cavity, the bulb including a discharge forming fill which emits light when excited by the microwave energy; and a reflector disposed within the microwave cavity and spaced from the bulb, wherein the reflector defines a reflective cavity which encompasses the bulb within its volume and a light emitting aperture, and wherein the reflective cavity has an inside surface area which is significantly less than an inside surface area of the microwave cavity, wherein the microwave cavity is defined by a hollow metal cylinder with solid walls which is open on both ends, and wherein the reflector comprises a hollow cylinder of reflective material which is open on one end and substantially closed on the other end, wherein the open end of the reflective cylinder defines the light emitting aperture and wherein an outer diameter of the reflective cylinder is closely matched to an inner diameter of the metal cylinder.

12. The electrodeless lamp as recited in claim 11, wherein the metal cylinder defining the microwave cavity is structurally rigid and resistant to deformation.

13. The electrodeless lamp as recited in claim 11, wherein the closed end of the reflector comprises a separate reflective disk.

14. The electrodeless lamp as recited in claim 11, wherein the closed end of the reflective cylinder is spaced from a wall of the microwave cavity.

15. The electrodeless lamp as recited in claim 14, wherein the closed end of the reflective cavity is closely spaced to the bulb.

16. An electrodeless microwave discharge lamp, comprising:

a source of microwave energy;

a microwave cavity;

a coupling structure configured to transmit the microwave energy from the source to the microwave cavity;

a bulb disposed within the microwave cavity, the bulb including a discharge forming fill which emits light when excited by the microwave energy; and a reflector disposed within the microwave cavity and spaced from the bulb, wherein the reflector defines a reflective cavity which encompasses the bulb within its volume and a light emitting aperture, and wherein the reflective cavity has an inside surface area which is significantly less than an inside surface area of the microwave cavity, wherein the microwave cavity is substantially sealed from environmental contamination, and wherein the microwave cavity is defined by a hollow metal cylinder with solid walls which includes an opening on one end in the area of the light emitting aperture and wherein the opening is covered by a quartz plate.

17. The electrodeless lamp as recited in claim 16, wherein the quartz plate comprises a conductive mesh disposed thereon or embedded therein.

* * * * *